United States Patent
Bose et al.

(10) Patent No.: US 9,081,983 B2
(45) Date of Patent: Jul. 14, 2015

(54) DATA DISTRIBUTION DATABASE AND METHOD FOR DATA DISTRIBUTION AND VERIFICATION

(71) Applicants: Ashoke Bose, Tucson, AZ (US); Min Fang, Shanghai (CN); Chunyu Chen, Shanghai (CN); Shengxue Gu, Shanghai (CN)

(72) Inventors: Ashoke Bose, Tucson, AZ (US); Min Fang, Shanghai (CN); Chunyu Chen, Shanghai (CN); Shengxue Gu, Shanghai (CN)

(73) Assignee: Bose International Investment Fund, LLC, Sahuarita, AZ (US)

( * ) Notice: Subject to any disclaimer, the term of this patent is extended or adjusted under 35 U.S.C. 154(b) by 306 days.

(21) Appl. No.: 13/849,372

(22) Filed: Mar. 22, 2013

(65) Prior Publication Data

US 2013/0262516 A1 Oct. 3, 2013

(30) Foreign Application Priority Data

Mar. 30, 2012 (CN) .......................... 2012 1 0089256

(51) Int. Cl.
*G06F 7/00* (2006.01)
*G06F 17/30* (2006.01)
*G06F 21/62* (2013.01)

(52) U.S. Cl.
CPC ........ *G06F 21/6218* (2013.01); *G06F 21/6227* (2013.01)

(58) Field of Classification Search
CPC .............. G06Q 30/0207; G06Q 50/24; G06Q 30/0224; G06F 17/3089; G06F 21/6218; G06F 21/6227
USPC .......... 707/770, 781, 783; 705/14.1, 14.25, 35
See application file for complete search history.

(56) References Cited

U.S. PATENT DOCUMENTS

2005/0144066 A1* 6/2005 Cope et al. ...................... 705/14
2008/0288466 A1* 11/2008 Eisenberger et al. ............. 707/3
2011/0276371 A1* 11/2011 Norcross et al. ............. 705/14.1

* cited by examiner

*Primary Examiner* — Md. I Uddin
(74) *Attorney, Agent, or Firm* — Carr & Ferrell LLP

(57) ABSTRACT

A distribution database includes at least one central database, in which data of use-value given by data a releaser and the values of use are stored, and several local databases, each of which is based at a data releaser's site, and which are bisynchronous with the central database. A method for data distribution and verification is provided. The data distribution database provides security and timeliness and requires lower levels of hardware resources. The method for data distribution and verification pertaining to this invention may enhance the data transmission range and use efficiency, and at the same time prevent the interest of the original data releaser against any harm as a result of data retransmission, and also assure shared interest and security for data users.

6 Claims, 5 Drawing Sheets

DATA DISTRIBUTION DATABASE AND METHOD FOR DATA DISTRIBUTION AND VERIFICATION

CROSS REFERENCE TO RELATED APPLICATIONS

The present application claims the priority benefit of Chinese patent application number 2012/10,089,256.5, filed Mar. 30, 2012. The disclosure of the aforementioned application is incorporated by reference.

FIELD OF THE INVENTION

The present invention relates generally to data distribution, and more particularly to data distribution databases and methods of data distribution and verification.

BACKGROUND

Databases are present in many aspects of the modern world. These databases exist as a way for those who have data, the data releasers, to provide the data to those who want or need the data, the data users. The distribution of data can happen in many different forms, from providing the data over an internet link, over a local area network, over a cellular network as a file, by e-mail . . . etc.

Presently this kind of data distribution database is mostly in the form of single tier, i.e. there is only one central database, as shown in FIG. 1. Operation of data distribution and verification is centralized to the central database for process, which may bring about the following defects.

First, data distribution and verification is processed in the central database, which calls for high requirement of both the central database concurrent processing capacity and the network broadband.

Second, there is a very high requirement for timeliness in data verification process. If the network connection between the data releaser and the central database is not stable, it will take a long time to get the result of data verification.

Third, data use efficiency is low. Normally a data releaser will release data of certain use value exclusively to those data users with whom the data releaser has certain relation, while other data users and other data releasers cannot gain access to such data, thus resulting in low data use efficiency.

Fourth, the data verification reliability is low. The use value of some data can be realized only once. Should such data be obtained by a malicious user and presented to the data releaser, the data releaser would only be able to verify such data rather than the user who presents the data. Thus normal users would be deprived of the use value of the data.

SUMMARY OF THE INVENTION

The present invention includes at least one central database which stores data of use-value released by data releasers and the values of use. The data releaser may further delimitate as to whether other data releasers have the authority of data retransmission, and whether data users have the authority of access. Subsequently, the data users may delimitate as to whether other data users have the authority to share.

The present invention may also include a number of local databases, each the local databases based at a data releaser's site and stays bisynchronous with the central database. Each of the local databases stores only those data of use-value and their value of use either distributed or retransmitted by the data releaser. The data releaser may delimitate as to whether other data releasers have the authority of retransmission, and as to whether data users have the authority of access.

The data distribution method related to the data distribution database includes delimitation at any time by the data releaser through the central database or the local data base as to whether other data releasers have the authority to retransmit such data distributed by the data releaser. The data releaser may also delimitate as to whether the data users have the authority to have access to the data so distributed by the data releaser.

Delimitation at any time by the data user through central database as to whether other data users have the authority to share the data so distributed by the data user.

Step 1: Data releaser who distributes data of use value through the database is called original data releaser, and such data of use value are called original data.

Step 2: The data user with the authority to have access to data released by the original data releaser is called user of original data.

In the meantime, another data releaser who has the authority of retransmission and retransmits the original data is called a secondary data releaser.

Original data once retransmitted are called retransmitted data, which are identical with original data, but their value of use is the product of the original data's use value multiplied by a weight of retransmission.

Step 3: Other data users having the authority of sharing, which users of original data have, have access to such original data through sharing. Such other data users are called original data sharing users.

In the meantime, a data user having the authority of access, which secondary data releasers have, have access to retransmitted data, and such data users are called secondary data users.

Step 4: Other data users having the authority of sharing, which secondary data users have, have access to such retransmitted data through sharing, and such other data users are called secondary data sharing users.

Data retransmission among data releasers as described in Step 2, and data sharing among data users as described in Step 3 and Step 4, continue by analogue.

The method of data verification for the data distribution database includes:

Step 1: After a data user gets an access to the data of use value, a verification code will be tied to each of data of use value in the central database;

Step 2: Any user presents to a data releaser the data of use value and its binding verification code.

Step 3: Data releaser searches through local database the data of use value and its binding verification code that are presented by the data user; if the two agree, then move to Step if any one or two are found otherwise, then move to Step 5.

Step 4: The local database gives a positive feedback, and the data releaser will then realize for the user the use value of the data presented by the latter.

Step 5: The local database gives a negative feedback, and the data releaser then won't realize for the user the use value of the data presented by the latter.

The data distribution database related to the present invention is featured by excellent security and timeliness, and calls only for lower requirement of hardware resources. The data distribution and verification related to the present invention greatly helps enhance data dissemination range and data use efficiency, and meanwhile it helps ensure that the interest of the original data releaser will not be impaired as a result of data retransmission and ensure the data users' shared interest and security.

DETAILED DESCRIPTION OF EXEMPLARY EMBODIMENTS

The present invention relates to a database and a method applied for realization of data distribution and verification by utilizing a database.

Figure 1:
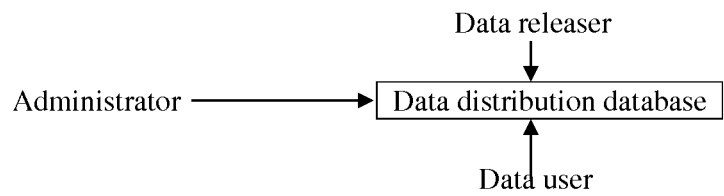
FIG. 1 shows a structural diagram of existing data distribution database.

There is a kind of database mainly used to distribute data of use value from one kind of users to another. Such databases are called data distribution databases. The former kinds of users are referred to as data releasers and the latter as data users, as shown in FIG. 1.

Figure 2:
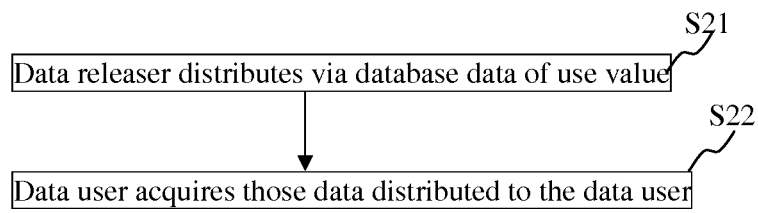
FIG. 2 shows a flow diagram of data distribution method for existing data distribution database.

As shown in FIG. 2, the method of data distribution applied for this kind of data distribution database includes the following:

Step S21: Data releaser releases to the database those data having use value. Such data release can be either directional, i.e., they can be made available to those eligible data users, or non-directional, i.e., they can be made available to data users.

Step. S22: Data users acquire those data of use value distributed to them. Such acquisition can be either active, i.e., data users can get such data by logging in on the database, or passive, i.e., the database can distribute data to each data users via e-mail, cell phone text . . . etc.

Figure 3:
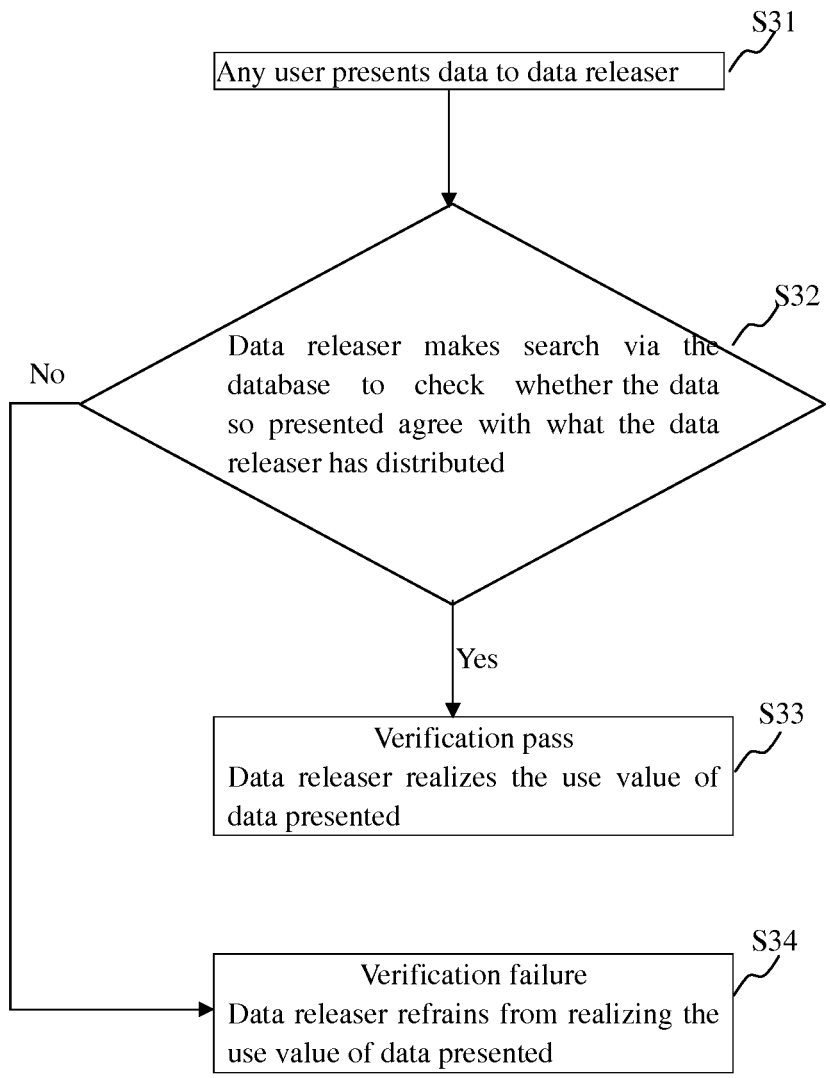
FIG. 3 shows a flow diagram of data verification method for existing data distribution database.

As shown in FIG. 3, the method of data verification applied for this kind of data distribution database including the following:

Step S31: Any user presents data of use value to data releaser.

Step S32: Data releaser inquires via the database about whether the data presented by the user are consistent with that distributed by the data releaser. If yes, move to Step S33, and if no, move to Step S34.

Step S33: The database gives positive feedback, and the data releaser will then realize for the user the use value of the data presented by the latter.

Step S34: The database gives negative feedback, and the data releaser then won't for the user the use value of the data presented by the latter.

Figure 4:
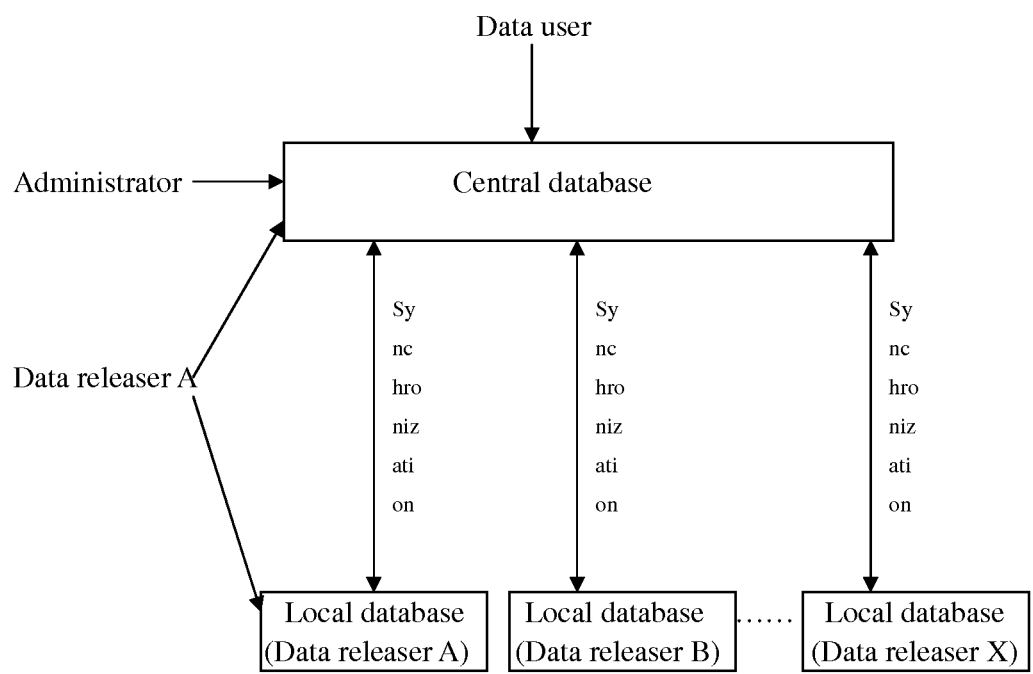
FIG. 4 shows a structural diagram of data distribution database of one embodiment of the present invention.

As shown in FIG. 4, the data distribution database relating to the present invention includes at least one central database, which can be either one server or a group of servers, and which stores data of use-value released by data releasers and the values of use The database also provides delimitation by each data releaser as to whether other data releasers have the authority of data retransmission, whether data users have the authority of access, and delimitation by each data user as to whether other data users have the authority to share.

A number of local databases, each of which is based at a data releaser's site, stay bisynchronous with the central database. Each local database stores only those data of use value and their value of use either distributed or retransmitted by the data releaser. Delimitation by the data releaser as to whether other data releasers have the authority of retransmission, and delimitation by the data releaser as to whether data users have the authority of access.

The retransmission authority of a data releaser refers to what is delimited by a data releaser as to whether other data releasers have the authority to retransmit the data distributed by the data releaser. For example, other data releasers may fall into two kinds, namely, "those who are allowed to retransmit the data distributed by me," and "those who are not allowed to retransmit the data distributed by me."

The authority of access of a data releaser refers to what is delimited by a data releaser as to whether data users have the authority of access to the data distributed by the data releaser. For example, data users may fall into two kinds, namely, "those who are allowed to have access to the data distributed by me," and "those who are not allowed to have access to the data distributed by me."

The authority of sharing of a data user refers to what is delimited by a data user as to whether other data users have the authority of sharing the data obtained by the data user. For example, other data releasers may fall into two kinds, namely, "those who are allowed to have authority to share the data acquired by me," and "those who are not allowed to have authority to share the data acquired by me."

If the data retransmission database supports binding verification code for data of use value, then also stored in the central database will be binding verification codes for each data user for the data of use value acquired. Meanwhile, stored also in local database will be binding verification codes for each data user for data of use value that are distributed or retransmitted by the data releaser and acquired by the data user.

Since each of local databases stays bisynchronous with the central database, each local database can be regarded as one subset of the central database, and they are mutually maintained in synchronous updating. That means such operations as data release, data verification, modification authority needed by data releasers can be performed either with a central database or a local database, and with the latter it may be improved in terms of timeliness and stability. However, operations such as a data user's modification authority can only be performed with the central database.

Figure 5:
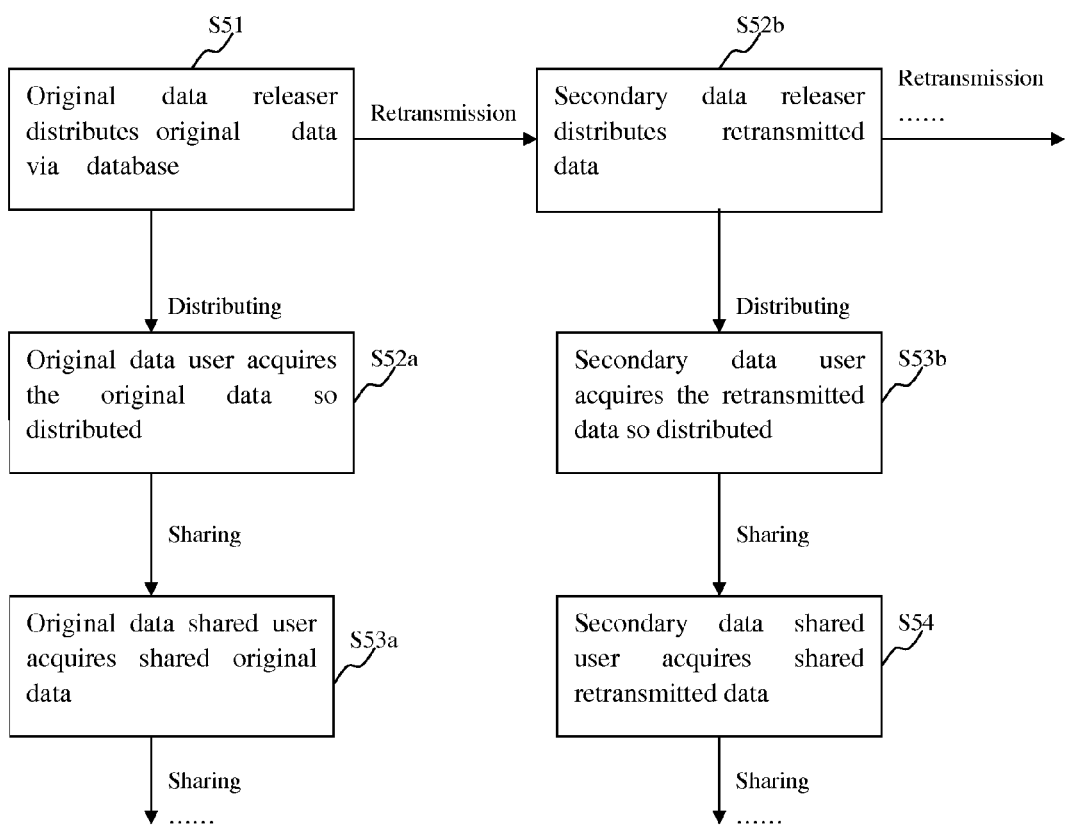
FIG. 5 shows a flow diagram of data distribution method for data distribution database of one embodiment of the present invention.

As shown on FIG. 5, the data distribution method related to the present invention for data distribution database includes the following:

Delimitation at any time by the data releaser through a central database or a local data base as to whether other data releasers have the authority to retransmit such data distributed by the data releaser and whether the data users have the authority to have access to the data distributed by the data releaser.

Delimitation at any time by the data user through central database as to whether other data users have the authority to share the data distributed by the data user.

Step S51: data releaser (called original data releaser) distributes in the database those data of certain use value (called original data).

Step S52a: data user having original data releaser's authority of access (called original data user) acquires those original data distributed by the original data releaser.

Step S52b: taking place at the same time as Step 52a, other data releaser having original data releaser's authority of retransmission (called secondary data releaser) retransmits the original data. Such data so retransmitted are called retransmitted data, and the step can also be called data distribution and retransmission. The retransmitted data are identical with the original data, but the use value of the retransmitted data is the product of original data's use value multiplied by weight retransmission. Since such retransmission is not mandatory, it depends on the retransmitted data releaser as to whether to perform such retransmission.

For instance, retransmission weight is the quotient of the ranking of retransmitted data releaser in the database divided by the ranking of original data releaser in the database. For example, based on the rate of utilization of the released data having use value, an original data releaser and a secondary data releaser rank 5th and 20th respectively in the database. If the original data's use value is 1, then the retransmission weight will be 4, and the retransmitted data's use value will be 4.

Step S53a: other data user having original data user's authority of sharing (called original data shared user) will also have access to the original data by sharing.

Step S53b: taking place at the same time as Step S53a, a data user having a secondary data releaser's authority of access (called a secondary data user) will have access to those data distributed to the data user.

Step S54: other data user having secondary data user's authority of sharing (called secondary data shared user) will also have access to the retransmitted data by sharing.

Data retransmission among data releasers as described in Step S52b, and data sharing among data users as described in Step S53a and Step S54 will continue by analogue.

Both data distribution in Step S51 and data retransmission in Step S52b can be either directional, i.e. only those data users having authority of access can have access to the data so distributed to them, or non-directional, i.e. such data can be distributed to data users.

Access to data as mentioned in Steps S52a, S53a and S54 can be either active, i.e. data users may have access to such data by logging onto and visiting the database, or passive, i.e. the database can distribute data to each data users via e-mail, cell phone text etc.

By means of existing data distribution method, data are distributed from one data releaser to several data users. However, by the data distribution method related to the present invention, data are distributed from one data releaser to several data users. By data retransmission among releasers and by data sharing among users, the data distribution range will get expanded tremendously, thus helping raise data dissemination efficiency and enhance the data utilization rate.

Figure 6:
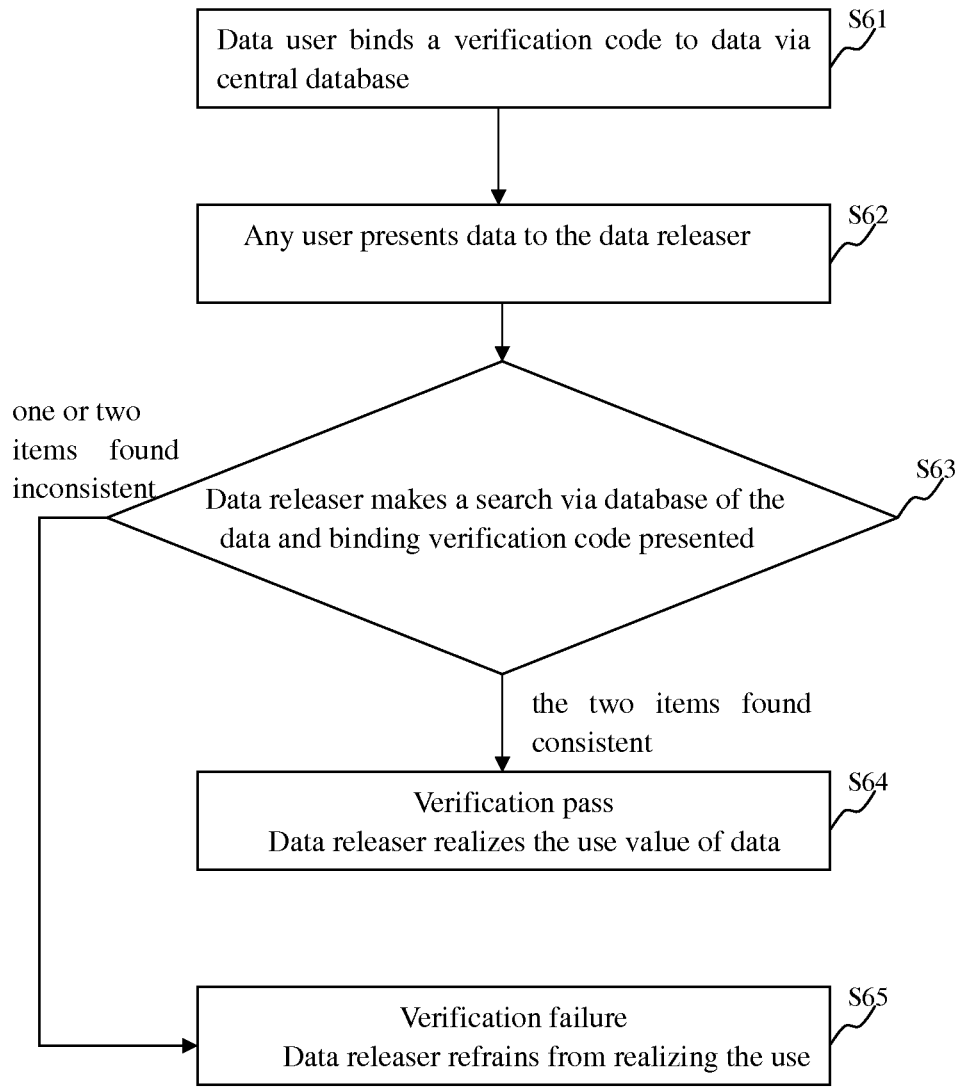
FIG. 6 shows a flow diagram of data verification method for data distribution database of one embodiment the present invention.

As shown FIG. 6, the data verification method related to the present invention for data distribution database includes the following:

Step S61: following a data user gets data of use value, and the central database will bind for a piece of data a verification code. Such verification code binding can be fulfilled either by logging on to the central data base or by sending a special form of text via mobile terminal.

Step S62: any data user presents the data and the binding verification code to the data releaser.

Step S63: the data releaser checks with the local database the data and binding verification code so presented by the data user. If the two agree, then the process proceeds to Step S64; whereas if any one or two are found otherwise, then the process proceeds to Step S65.

Step S64: if the local database gives a positive feedback, then the data releaser will realize for the user the use value of the data presented by the latter.

Step S65: if local database gives a negative feedback, then the data releaser won't realize for the user the use value of the data presented by the latter.

Furthermore, in Step S64, the local database will at the same time return the use value at the data releaser's place of the data with use value presented by the user. For instance, the utilization of the data having use value at the original data releaser's place is equal to the original use value, while the utilization of the data with use value at the secondary data releaser's place is equal to the product of the original use value multiplied by the weight retransmission weight.

The existing data verification method is only applicable for the verification of data with use value. The security with such method may be apparently inadequate against data users' sharing operation background related to the present invention. Therefore the present application adds to it a dual operation for both data and verification code so as to ensure the data users' interest will not be affected by shared operation and also guarantee security.

The data distribution database together with the data distribution and verification method related to the present invention is featured by the following advantages:

First, each local database is one of the subsets of the central database, and a collection of local databases can be considered as a backup of the central database, which helps enhance the security of the data stored therein.

Second, data releaser's operations, including data release, data verification and authority modification, will be preferably performed at a local database, and then via bisynchronous operation between the local database and the central database, corresponding data in the central database are modified. An exemplary embodiment of the present technology reduces the workload on concurrent process capacity of the central database. The bisynchronous operation may be also performed at the time when the network is idle and stable, which may lessen the requirements on network bandwidth and network connection.

Third, data verification may be achieved because it is processed in the local database, and therefore improved timeliness can be achieved.

Fourth, data utilization rate may be improved. Due to the introduction of data retransmission among data releasers and data sharing among data users, the traditional mode of one-to-many data release may make a data dissemination range expand and the utilization rate may rise.

Fifth, for data retransmission among data releasers, the retransmitted data and the original data may be maintained constant. However, the use values of the two may be converted so as to maintain original data releasers' interest and initiative.

Sixth, data verification may be reliable. Use value of some data may be realized only once. When such data are obtained by malicious users and produced to a data releaser, such data releaser needs to verify the data and the binding verification code at the same time. If the verification code cannot be produced or an error occurs to the verification code, the data's use value may not be realized. This provides yet another protection for the security of sharing operation among data users, thus helping improve data users' shared interest and their initiative.

The following is a description of the present invention utilized under a specific application circumstance. For example, on a neutral database platform, many merchants may play a role of data releaser while many consumers play a role of data user. A merchant distributes electronic coupons to designated consumers.

The data distribution database related to the present invention contains firstly, a central database where data are stored, secondly, set at each merchant's place is a local database containing data stored in the central database and relevant to the merchant, and thirdly, the two databases stay bisynchronous with each other.

At the time of data distribution, the merchant A100 distributes coupon C100 to consumers B100-B105 with use value set at "RMB 10 Yuan discount for each RMB 100 consumed at the place of merchant A100". Consumer B100 shares the coupon C100 with consumer B106, and consumer B106 shares the coupon C100 with consumer B107. Merchant A200 retransmits to consumers B200-B210 the coupon C100 as C200.

Suppose if, according to coupon utilization rate in the database, merchant A100 and merchant A200 rank at the 10th place and the 20th place respectively. The weight of retransmission would be 2, and then the use value of the coupon C200 retransmitted by merchant A200 would be "RMB 20 Yuan discount for each RMB 100 consumed at the place of merchant A200". Consumer B200 shares with consumer B211 the retransmitted coupon C200, and consumer B211 shares with consumer B212 the retransmitted coupon C200. Merchant A300 may further retransmit the coupon C200 retransmitted by merchant A200 as C300.

It can be seen from the above that due to the introduction of means of expanding data dissemination for both data retransmission by merchants and data sharing by consumer, the original coupon C100 can be changed to coupon C200, C300 according to the weight of retransmission, and the objective recipients can be extended from consumers B100-B105 to consumers B106, B107, B200-B212.

For an optimal arrangement, consumer B211 who receives coupon C200 so retransmitted may either have the use value of coupon C200 realized at the place of merchant A200 or have coupon C100 realized at merchant A100's place as per its use value.

For data verification, each consumer has a verification code for the coupon. A merchant may check the coupon and verification code at the same time to ensure the coupon will not be used unlawfully.

In certain embodiments of the invention, these definitions apply: the at least one data releaser who releases data of use value through the at least one central database is called original data releaser; the data of use-value released are called original data; the data user with authority of access to original data released by the original data releaser is called a user of original data; the other data releaser with authority of retransmission of the original data released by the original data releaser is called a retransmitted data releaser; original data released by the original data releaser once retransmitted are called retransmitted data and may be identical to original data; value of use may be the product of a use value of the original data multiplied by a weight of retransmission; other data users having authority of sharing and having access to such original data through sharing are called original data sharing users; data users having the authority of access have access to retransmitted data and are called retransmitted data users; and other data users having the authority of sharing are called secondary data sharing users.

The example taken above for the present invention is only an optimal case, which is not limited to the present invention. For technical professionals of the field, the present invention may have various modifications and changes. Any modification, equivalent replacement and renovation made within the concept and principle of the present invention shall be incorporated in the protection range of the present invention.

What is claimed:

1. A data distribution database comprising:
at least one central database storing data of use-value and values of use, the data of use-value being released by at least one data releaser, the at least one data releaser delimiting as to whether other data releasers have authority of data retransmission, the at least one data releaser further delimiting as to whether data users have authority of access, the data users delimiting as to whether other data users have authority of sharing;
at least one local database based at a data releaser's site, the at least one local database staying bisynchronous with the at least one central database, the at least one local database storing the data of use-value and values of use at least one of distributed and retransmitted by the at least one data releaser, the data releaser delimiting as to whether other data releasers have authority of retransmission, the data releaser further delimiting as to whether data users have authority of access;
a delimitation by the at least one data releaser as to whether other data releasers have authority to retransmit the data of use-value released by the at least one data releaser, the delimitation made through at least one of the at least one central database and the at least one local database;
a second delimitation by the at least one data releaser as to whether the data users have authority to have access to the use-value data released by the at least one data releaser, the second delimitation made through the at least one of the at least one central database and the at least one local database;
a third delimitation by one of the data users through the at least one central database as to whether the other data users have authority to share the data distributed by the data user;
a determination of a value of use, the value of use being a product of a use-value of the data of use-value multiplied by a weight of retransmission; and
a determination of the retransmission weight, the retransmission weight being a quotient of a retransmitted data releaser's ranking in the at least one central database divided by an original data releaser's ranking in the at least one central database.

2. The data distribution database of claim 1, further comprising:
a binding verification code associated with each data user stored in the at least one central database, the binding verification code allowing each data user to access the data of use-value; and
another binding verification code associated with each data user stored in the at least one local database, the other binding verification code allowing each data user to access the data of use-value and values of use at least one of distributed and retransmitted by the at least one data releaser.

3. A method of data verification, comprising:
storing data of use-value and values of use on at least one central database, the data of use-value being released by at least one data releaser;
delimiting authority of access to at least one data user by the at least one data releaser;
tying a verification code to at least one of the data of use-value released by the at least one data releaser;
presenting, by a user, to the at least one data releaser the verification code;
searching, by the at least one data releaser, a local database for the data of use-value and the tied verification code presented to the at least one data releaser by the user;

a delimitation by the at least one data releaser as to whether other data releasers have authority to retransmit the data of use-value released by the at least one data releaser, the delimitation made through at least one of the at least one central database and the local database;

a second delimitation by the at least one data releaser as to whether the at least one data user has authority to have access to the use-value data released by the at least one data releaser, the second delimitation made through at least one of the at least one central database and the local database;

a third delimitation by one of the data users through the at least one central database as to whether other data users have authority to share the data distributed by the data user;

a determination of a value of use, the value of use being a product of a use-value of the data of use-value multiplied by a weight of retransmission; and a determination of the retransmission weight, the retransmission weight being a quotient of a retransmitted data releaser's ranking in the at least one central database divided by an original data releaser's ranking in the at least one central database.

4. The method of claim 3, further comprising:
realizing for the at least one data releaser a use-value for the data released by the at least one data releaser when both the data of use-value and the tied verification code are found in the searching step.

5. The method of claim 3, further comprising:
not realizing for the at least one data releaser a use-value for the data released by the at least one data releaser when only one of the data of use-value and the tied verification code are found in the searching step.

6. The method of claim 4, further comprising:
substantially simultaneously returning the use-value at a site of the at least one data releaser's site of the data having use-value presented by the user.

* * * * *